US006013217A

United States Patent [19]

Hauenstein et al.

[11] Patent Number: 6,013,217

[45] Date of Patent: Jan. 11, 2000

[54] METHOD FOR EXTRUDING THERMOPLASTIC RESINS

[75] Inventors: Dale Earl Hauenstein, Midland; Arnold Wade Lomas, Rhodes; Kevin Edward Lupton; David Joseph Romenesko, both of Midland, all of Mich.

[73] Assignee: Dow Corning Corporation, Midland, Mich.

[21] Appl. No.: 08/996,586

[22] Filed: Dec. 22, 1997

[51] Int. Cl.[7] .................. B29C 47/68

[52] U.S. Cl. .................. 264/169; 264/211; 264/176.1; 525/106; 524/581; 524/265; 524/154; 524/151; 524/147; 524/127; 524/130; 524/148; 524/133; 524/140; 524/139; 524/141

[58] Field of Search .................. 264/169, 211, 264/176.1; 525/106; 524/581, 265, 154, 151, 147, 127, 130, 148, 133, 140, 139, 141

[56] References Cited

U.S. PATENT DOCUMENTS

| | | | |
|---|---|---|---|
| 4,265,801 | 5/1981 | Moody | 260/40 |
| 4,535,113 | 8/1985 | Foster | 524/262 |
| 4,552,712 | 11/1985 | Ramamurthy | 264/85 |
| 4,554,120 | 11/1985 | Ramamurthy | 264/85 |
| 4,863,983 | 9/1989 | Johnson et al. | 524/140 |
| 4,925,890 | 5/1990 | Leung | 524/133 |
| 4,931,492 | 6/1990 | Foster | 524/188 |
| 4,948,543 | 8/1990 | Pawlowski et al. | 264/85 |
| 4,978,436 | 12/1990 | Kelly | 204/165 |
| 5,008,056 | 4/1991 | Kurtz et al. | 264/130 |
| 5,041,586 | 8/1991 | Beck et al. | 556/405 |
| 5,089,200 | 2/1992 | Chapman, Jr. | 264/127 |
| 5,708,084 | 1/1998 | Hauenstein et al. | 525/12 |
| 5,849,231 | 12/1998 | Enlow | 264/169 |
| 5,861,450 | 1/1999 | Chen et al. | 524/269 |

FOREIGN PATENT DOCUMENTS

| | | |
|---|---|---|
| 0600166A1 | 5/1993 | European Pat. Off. . |
| 0722981A2 | 5/1996 | European Pat. Off. . |
| 826727 | 3/1998 | European Pat. Off. . |
| 722 981 A2 | 7/1998 | European Pat. Off. . |
| 3-203123 | 9/1991 | Japan . |
| 1062241 | 12/1983 | U.S.S.R. . |

*Primary Examiner*—Margaret G. Moore
*Attorney, Agent, or Firm*—Alex Weitz

[57] ABSTRACT

The present invention relates to a method for processing a thermoplastic resin composition by extruding the composition through a nickel die to provide an extrudate having a low degree of surface roughness, said composition comprising (A) 100 parts by weight of a thermoplastic resin;

(B) 0.01 to 1 part by weight of a hydroxy-functional diorganopolysiloxane having a number average molecular weight of at least 10,000; and (C) 0.001 to 1 part by weight of an organophosphorous compound.

10 Claims, No Drawings

METHOD FOR EXTRUDING THERMOPLASTIC RESINS

FIELD OF THE INVENTION

The present invention relates to a method for forming plastic articles. More particularly, the invention relates to a method for extruding a thermoplastic resin composition through a nickel die, wherein said resin is modified with a combination of a hydroxy-functional diorganopolysiloxane and an organophosphorous compound, whereby the resulting extrudate exhibits a low level of surface defects known in the art as melt fracture or "sharkskin."

BACKGROUND OF THE INVENTION

When a high molecular weight thermoplastic resin is extruded through a die, smooth extrudates can only be obtained up to a certain shear stress (i.e., shear rate; extruder output rate). Beyond that, surface irregularities begin to appear. Irregularities such as haze and surface roughness, known in the art as melt fracture or "sharkskin," limit the production rates in commercial applications. To counteract these undesirable phenomena, and thereby achieve higher output rates, process aids are typically added to the thermoplastic resin prior to extrusion. One of the primary functions of a process aid is to delay, suppress, or eliminate, the onset of surface flow defects such as haze and sharkskin and to enable operation at higher shear stress.

For example, certain fluoroelastomers have been found to delay the onset of melt fracture and the above mentioned surface defects in thermoplastics such that higher shear rates and output can be attained while still producing acceptable extrudates. Such additives are typically employed at a level of about 250 to 3,000 parts per million based on the weight of the thermoplastic. They are generally added to the thermoplastic resin prior to extrusion by dry blending a fluoroelastomer concentrate therewith. These fluorine-containing elastomers are, however, quite expensive and other systems have been proposed.

Process aids for thermoplastic polymers which preferably consist of a combination of a silicone-glycol copolymer and a phosphorous adjuvant were disclosed by Leung et al. in U.S. Pat. No. 4,925,890. The silicone-glycol actually illustrated as a process aid for various polyolefins and a polycarbonate thermoplastics is a polydimethylsiloxane having carbinol-terminated poly(ethylene oxide) grafts (i.e., —COH end group on the side chains). This patent makes no distinction with respect to the materials of construction of equipment used to process these compositions, mild steel and chrome-plated extrusion die inserts being the only types illustrated.

A similar extrusion method is disclosed in EP Publication 0722981 to Dow Corning Corp., published Jul. 24, 1996. In this case, 0.01 to 1 part by weight of a hydroxy-functional diorganopolysiloxane (i.e., a silanol or —SiOH functional polymer) is added to 100 parts by weight of a polyolefin resin. The resulting composition can be extruded at relatively high rates with little sharkskin formation. Again, there is no suggestion that die construction is critical and only a P-20 alloy steel (i.e., a non-nickel containing steel) die was employed in the examples.

SUMMARY OF THE INVENTION

We have observed that there is an interaction between compositions of the type described in EP 0722981 and the nature of the die used to extrude the compositions. Thus, although the compositions according to EP 0722981 provide high quality extrudates when processed through a steel die, these blends exhibit a greater degree of melt fracture when they are extruded through a nickel-coated die under similar processing conditions. From a practical perspective, this finding should be of concern to the plastics industry since nickel-coated dies can be easily polished to provide exceptionally smooth extrudates and are therefore commonly employed in such critical applications as the production of blown film. Moreover, these dies are known to be resistant to corrosion fluid provide a high degree of lubricity and release during the extrusion process. Surprisingly, the above mentioned untoward effect is reduced when the nickel die surface is formed by an electroless rather than an electrolytic plating process, the former being carried out by dipping the die in a suitable metal bath which contains a reducing agent. In the electroless plating, process, the surface of the substrate metal must provide a catalytic surface for the subsequent deposition reaction and the process is also known as the autocatalytic reduction of nickel ions by the use of a reducing agent. As initially fabricated, the surface layer of such an electroless nickel die typically contains about 5 to 7 weight percent phosphorous. And, while the inventors do not wish to be bound by any mechanism or particular theory, it is believed that this element somehow promotes interaction of the hydroxyl-functional diorganopolysiloxane with the nickel surface to produce the improved extrudate relative to the pure nickel surface of the aforementioned electrolytic process. However, as more and more plastic composition is extruded through an electroless nickel die, deterioration of extrudate surface appearance is observed, this phenomenon presumably resulting from depletion of phosphorous from the die's surface. Clearly, such a change in product quality is not acceptable in many plastic processing applications.

We have now discovered that the above described process limitation of the polyolefin/hydroxy-functional diorganopolysiloxane compositions can be largely overcome by incorporating a small amount of an organophosphorous compound therein.

The present invention, therefore, relates to a method for processing a thermoplastic resin composition comprising: extruding a composition comprising (A) 100 parts by weight of a thermoplastic resin;

(B) 0.01 to 1 part by weight of a hydroxy-functional diorganopolysiloxane having a number average molecular weight of at least 10,000; and (C) 0.001 to 1 part by weight of an organophosphorous compound through a nickel die.

The invention further relates to the above described thermoplastic resin composition.

DETAILED DESCRIPTION OF THE INVENTION

Thermoplastic resin (A) is any organic (i.e., non-silicone) resin which can be processed in conventional extrusion equipment by heating the resin to a temperature above its glass transition or melt point and forcing the resin melt through the nickel die. For the purposes herein, it is contemplated that this die construction includes nickel coatings on a base substrate such as steel (e.g., the above mentioned electrolytically plated or electroless systems) as well as nickel alloys. It is contemplated that such a coating or alloy has a nickel content of at least about 50 weight percent, preferably 80 weight percent and most preferably, essentially 100%. When a die surface has a nickel content of less than about 50 weight percent, the addition of the organophosphorous compound does not provide the above stated advantage and other die compositions can be used to obtain high quality extrudate.

Within the above stated processing limitation, component (A) can be any organic polymer or interpolymer. For example, this resin can be an addition polymer selected from such systems as polyolefins, fluorocarbon polymers, vinylic polymers, styrenic polymers, acrylic polymers, diene elastomers, thermoplastic elastomers and polyacetals. Examples of polyolefins are the homopolymers, copolymers and terpolymers of ethylene, propylene, butene-1,4-methyl pentene-1 and isobutylene. Examples of fluorocarbon polymers are polytetrafluoroethylene and polytrifluorochloroethylene. Examples of vinyl polymers are polyvinyl chloride, polyvinyl acetate, polyvinyl alcohol, polyacrylonitrile and the co- and terpolymers thereof. Examples of styrenic polymers are polystyrene, poly(a-methyl styrene), the co- and terpolymers thereof and with other monomers such as acrylonitrile, methyl methacrylate, and the like. Examples of acrylic and methacrylic polymers are polyacrylic acid and polymethacrylic acid, their copolymers, esters and salts. Examples of polydienes are polybutadiene, polyisoprene, polychloroprene, polycyanoprene and copolymers thereof. Examples of polyacetals are polymethylene oxide, polytrioxane and copolymers thereof.

Alternatively, the resin can be a condensation polymer selected from such systems as polyesters, polyamids, polycarbonates, polysulfones and polyurethanes. Examples of polyesters are polyethylene terephthalate, polybutylene terephthalate, polyethylene isophthalate and their copolymers. Examples of polyamides are poly-e-caprolactam, polyhexamethylene adipamide and polyhexamethylene sebacamide. An example of a polycarbonate is the reaction product of a bisphenol A with diphenyl carbonate and an example of a polysulfone is the reaction product of an alkaline salt of bisphenol A with p,p'-dichlorophenyl sulfone. Examples of polyurethanes include reaction products of hexamethylene diisocyanate and tetramethylene glycol and reaction products of diphenylmethane-p,p'-diisocyanate, adipic acid and butanediol.

Further, the resin can be selected from such systems as thermoplastic cellulosic ethers and esters, such as ethyl cellulose, cellulose acetate, cellulose butyrate, hydroxy propyl cellulose, and the like.

Preferably, thermoplastic resin (A) is selected from olefin polymers, copolymers, terpolymers and blends thereof. For example, the resin may be selected from homopolymers of olefins as well as interpolymers of one or more olefins with each other and/or up to about 40 mole percent of one or more monomers which are copolymerizable with the olefins. Examples of suitable polyolefins include homopolymers of ethylene, propylene, butene-1, isobutylene, hexene, 1,4-methylpentene-1, pentene-1, octene-1, nonene-1 and decene-1, inter alia. Interpolymers of two or more of the above mentioned olefins may also be employed as component (A) and they may also be copolymerized with, e.g., vinyl or diene compounds or other such compounds which can be copolymerized with the olefins. Specific examples of suitable interpolymers are ethylene-based copolymers, such as ethylene-propylene copolymers, ethylene-butene-1 copolymers, ethylene-hexene-1 copolymers, ethylene-octene-1 copolymers, ethylene-butene-1 copolymers and interpolymers of ethylene with two or more of the above mentioned olefins.

Component (A) may also be a blend of two or more of the above mentioned homopolymers or interpolymers. For example, the blend can be a uniform mixture of one of the above systems with one or more of the following: polypropylene, high pressure, low density polyethylene, high density polyethylene, polybutene-1 and polar monomer-containing olefin copolymers such as ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers and ethylene/acrylic acid/vinyl acetate terpolymers, inter alia.

Particularly preferred polyolefins (A) are polyethylene (PE) polymers such as low pressure, substantially linear, ethylene homopolymers and interpolymers of ethylene with alpha-olefins having 3 to 10 carbon atoms, such interpolymers being known as linear low density polyethylene (LLDPE) in the art. Preferably, these systems have a density of about 0.85 to 0.97 g/cc, more preferably 0.875 to 0.930 g/cc, and a weight average molecular weight of about 60,000 to about 200,000.

The above polymers and interpolymers are well known in the art and further description thereof is considered unnecessary.

The diorganopolysiloxane (B) of the present invention is a hydroxy-functional (i.e., silanol-functional) oil or high consistency gum having a number average molecular weight ($M_n$) of at least about 10,000, but preferably below about 1,000,000. Preferably,, the $M_n$ of component (B) is about 40,000 to about 400,000, more preferably about 75,000 to about 400,000. When the molecular weight is below about 10,000 the compositions tend to exhibit excessive screw slip during extrusion. Furthermore, at the lower molecular weights there is a marked decrease in extruder output when the compositions are extruded a second time. Such a second extrusion is often required in industrial operations. For example, errors in manufacture, such as incorrect extruder settings or omission of/insufficient amount of key ingredients, necessitate re-extrusion of the resulting "off-spec" material. Likewise, in film blowing operations, the edge portions of a flattened bubble are trimmed and recycled to the extruder. Further, re-extrusion is employed when scrap is returned and recycled, this procedure being known as "post-consumer recycle" in the art. On the other hand, when the molecular weight is above about 1,000,000, mixing the diorganopolysiloxane into the polyolefin becomes difficult but such a siloxane could still be employed.

Thus, in order to achieve a good balance with respect to sharkskin, screw slippage and extrusion efficiency of recycled material, it is preferred that component (B) is a gum having $M_n$ in the approximate range of 100,000 to about 400,000 and most preferably about 250,000 to about 350,000.

Component (B) may be a linear or branched polymer or copolymer wherein the organic groups are independently selected from methyl or phenyl radicals.

Suitable diorganopolysiloxanes include polydimethylsiloxane homopolymers, copolymers consisting essentially of dimethylsiloxane units and methylphenylsiloxane units, copolymers consisting essentially of dimethylsiloxane units and diphenylsiloxane units, copolymers consisting essentially of diphenylsiloxane units and methylphenylsiloxane units, and homopolymers of methylphenylsiloxane units. Mixtures of two or more such polymers or copolymers may be employed as component (B).

For the purposes of the present invention the diorganopolysiloxane (B) must contain at least one silicon-bonded hydroxyl group (i.e., ≡SiOH) in the molecule. The hydroxyl group or groups may be located at the ends of the molecule, they may be distributed along the chain or they may be located both at the ends as well as along the chain. Preferably, the hydroxyls reside at the molecular chain ends in the form of diorganohydroxysiloxy groups, such as dimethylhydroxysiloxy, diphenylhydroxysiloxy, and methylphenylhydroxysiloxy, inter alia. When the hydroxyls are located only along the chain, the terminal groups of the diorganopolysiloxane may be any non-reactive moiety, typically a triorganosiloxy species such as trimethylsiloxy.

It is preferred that the diorganopolysiloxane (B) is a linear polydimethylsiloxane containing up to about 50 mole percent of phenyl radicals. Most preferably, it is a polydimethylsiloxane homopolymer having dimethylhydroxysiloxy end groups.

Component (B) is well known in the art and many such polymers and copolymers are available commercially. However, in the usual commercial preparation of these polymers, a considerable amount of low molecular weight cyclic polysiloxane species is formed. For the purposes herein, it is preferred that these cyclics be removed (e.g., by stripping at elevated temperatures and/or reduced pressure) since they generally impart undesirable characteristics to the instant compositions and/or process. For example, the presence of cyclics can degrade the surface quality of the extrudate, generate foaming and/or smoke or it can increase the amount of screw slippage during extrusion.

Component (C) is an organophosphorous compound having at least one phosphorous atom in its molecule. The nature of the organic functionality on this compound is not critical as long as these groups do not adversely affect the properties of the resulting resin extrudate or the processabilty thereof. Thus, for example, component (C) can be an organophosphate, an organophosphite, an organophosphine or an organophosphine oxide, wherein the organo groups have, e.g., 1 to 20 carbon atoms. Further, the organic groups of (C) do not have to be directly bonded to the phosphorous atom(s) of this component but may be attached through hetero atoms, such as silicon. For example, organosilylphosphates such as

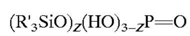

wherein R' is a hydrocarbyl group having 1 to 20 carbon atoms, preferably an alkyl group having 1 to 8 carbon atoms or a phenyl radical and z is 1 to 3, are useful in the present compositions. Highly preferred organophosphorous compounds wherein the organic functionality is bonded to silicon are organosilylphosphonates having a formula selected from

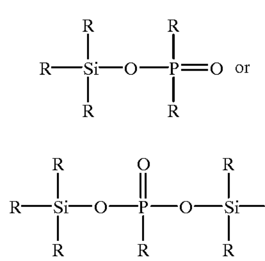

In formulas (i) and (ii), R is independently selected from hydrocarbyl groups having 1 to 20 carbon atoms. Preferably R in formula (i) or (ii) is either an alkyl group having 1 to 8 carbon atoms or an alkenyl group having 2 to 8 carbon atoms. Most preferably, R in this embodiment is selected from methyl or vinyl radicals, as illustrated in the examples, infra.

From a practical consideration, it is preferred that the organic functionality of component (C) is stable under the extrusion conditions for any given system and that it not react with the resin or the hydroxy-functional diorganopolysiloxane at the elevated temperatures required to extrude the composition. This is generally observed when at least one of the organic functionality is aryl, this group being known for its thermal stability. Thus, preferred organophosphorous compounds are represented by a formula selected from the group consisting of

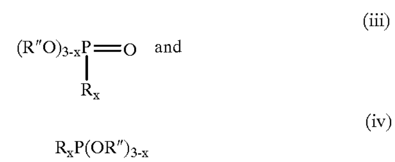

wherein R is again independently selected from hydrocarbyl groups having 1 to 20 carbons, preferably 1 to 8 carbon atoms. In formulas (iii) and (iv), R" is an aryl or substituted aryl group and x is an integer having a value of 0 to 3. Preferably, R" is phenyl or phenyl substituted with one or more $C_1$ to $C_{20}$ alkyl radicals and x is 0. Preferred compounds according to formula (iii) include triphenylphosphate, tert-butylphenyl diphenyl phosphate and triphenylphosphine oxide. Preferred compounds according to formula (iv) include tris(2,4-di-tert-butylphenyl) phosphite, trisnonylphenylphosphite and triphenylphosphine.

Another highly preferred component (C) has the formula

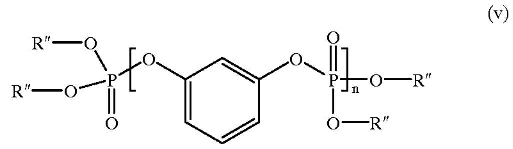

wherein R" is independently selected and has its previously defined meaning; preferably, R" in is a phenyl radical in formula (v). In this formula, n has an average value of 1 to 3, preferably 1.

The compositions which are employed in the method of the present invention are prepared by thoroughly dispersing from about 0.01 to 1 part by weight (100 to 10,000 parts per million) of diorganopolysiloxane (B) in 100 parts by weight of a polyolefin (A). It is preferred that about 0.02 to 0.5 part by weight (200 to 5,000 ppm) of component (B) is used for each 100 parts by weight of component (A). More preferably, about 0.03 to 0.2 part of (B), and most preferably about 0.04 to 0.2 part, per 100 parts by weight of (A) are used. When the diorganopolysiloxane is added at levels below about 0.01 part per 100 parts by weight of (A), there is little improvement in the surface quality (i.e., sharkskin) versus the corresponding unmodified polyolefin, particularly at high rates of extrusion. Similarly, at levels higher than about 1 part of (B) per 100 parts by weight of (A), the surface quality of the extrudate again begins to deteriorate. Furthermore, when more than about 1 part of (B) per 100 parts by weight of (A) is used, an excessive amount of siloxane is observed on the surface of the extrudate which adversely impacts such properties as printability and sealability. Additionally, the physical properties of the final extrudate are degraded. Thus, the above recited preferred compositional ranges result in the desired balance of good surface quality (i.e., little sharkskin), clarity, smoothness, sealability, paintability and gloss of the extruded material as well as low screw slip during processing, particularly at high extruder output rates.

The organophosphorous compound is added in an amount sufficient to improve the extrudate quality relative to a corresponding extrudate which does not include this key component when processed through a nickel die. This amount is generally determined through routine experimentation by extruding each composition through a nickel or nickel-coated die followed by evaluation of the extrudate. Quantitative evaluation of extrudate surface can be carried out by a surface roughness measurement, as described infra. Typically, however, the evaluation is of a qualitative nature which involves a visual comparison of extrudates or films with respect to amount and degree of sharkskin present and/or clarity. For the purposes of the evaluation, it is preferred to use a pure nickel or electrolytically-plated nickel die in order to eliminate the alloy effects, as described supra. It is preferred that the least quantity of (C) needed to obtain the stated improvement in extrudate surface is used so as not to degrade bulk physical properties of the resulting compositions which generally occurs when (C) is added at more than about 1 part for each 100 parts by weight of (A). Typically, component (C) is added at a level of about 0.001 to about 1 part by weight for each 100 parts by weight of component (A), preferably about 0.01 to 0.5 part by weight, optimum ranges being readily determined for a given system by routine experimentation.

The dispersion of diorganopolysiloxane (B) and organophosphorous compound (C) into resin (A) may be accomplished by any of the traditional means for mixing additives into thermoplastic resin at elevated temperature. For example, the two components may be blended in a twin-screw extruder, a Banbury mixer, a two-roll mill or a single-screw extruder, either with or without a mixing head. The equipment used to mix these components is thus not critical as long as a uniform dispersion of (B) in (A) is attained. Preferably the dispersed particle size is no larger than about 10 micrometers.

In addition to the above components, compositions of the present invention may also contain up to about 1 percent by weight of each of the following: fillers, cure agents lubricants, u.v. stabilizers, antioxidants, antiblock agents, catalyst stabilizers and other process aids commonly employed in the modification of resins. When more than about 1 weight percent of any of these additional ingredients is used, there is interference with the process aid of the present invention such that the above described benefits in processing and/or the character of the resulting extruded materials are not obtained. This is particularly critical in the case of blown film production, where good surface quality is crucial.

Specific non-limiting examples of the above additional ingredients include the following substances. Diatomaceous earth, octadecyl-3-(3,5-di-5-butyl 4-hydroxyphenyl) propionate, bis(2-hydroxyethyl)tallowamine, calcium stearate, N,N-bis(2,2,6,6-tetramethyl-4-piperidinyl)-1,6-hexanediamine polymer with 2,4,6-trichloro-1,3,5-trizaine and 2,4,6-trichloro-1,3,5-trizaine and 2,4,4-trimethyl 1,2-pentanamine, dimethyl succinate polymer with 2,2,6,6-tetramethyl-1-piperridineethanol, 2,2-thiobis)4tert-octylphenolato-n-butylamine nickel, polyethylene glycol, Erucamide, titanium dioxide, titanium dioxide, alumina, hydrated alumina, talc, 2-hydroxy4-n-octyloxy-benzophenone, zinc oxide, zinc sulfide and zinc stearate.

According to the method of the present invention, the above described diorganopolysiloxane (B) and organophosphorous compound (C) are added to resin (A) and serve as a process aid therefor when the resin is extruded through a nickel die at elevated temperatures to form a shaped product (e.g., a cylindrical cross-section, such as a film, ribbon, bar, annulus, fiber, sheet, or the like). The resulting extrudate has an improved surface (e.g., less sharkskin, improved uniformity and clarity) relative to a similar extrudate which contains only diorganopolysiloxane (B) as the additive, as taught in above cited EP Publication 0722981. This method is particularly applicable to the production of cast film (film casting) or blown film (film blowing), but also finds utility in extrusion blow molding; injection molding; pipe, wire, or cable extrusion; fiber production; and any similar high shear melt processing of polyolefin resins, all of these techniques being well known in the art. Briefly stated, blown film is typically produced by a "bubble" technique, wherein the polyolefin composition (i.e., the melt) is extruded through an annular die to form a film in the shape of a bubble. This bubble is withdrawn from the die at a rate greater than the rate of extrusion, while a positive air pressure is maintained within the bubble. Film produced in this manner is biaxially oriented as a result of stretching in the radial and axial directions and this orientation generally imparts improved mechanical properties to the film. Cast film is generally prepared by extruding the resin, typically a polyolefin, through a slot die followed by cooling on one or more chill rolls.

Although it is possible to obtain a relatively uniform dispersion by injecting components (B) and (C) along the screw section of an extruder while polyolefin pellets are fed in through the hopper thereof, it is preferred to first thoroughly disperse these components in a portion of component (A) to form a masterbatch. This masterbatch (or concentrate), which preferably contains about 1 to 50, more preferably 2.5 to 25, weight percent of the diorganopolysiloxane and a similar weight percent of the organophosphorous compound, may be ground up or pelletized, the resulting particulate dry-blended with additional resin (the matrix) and this blend then extruded to form a composition of the invention. Use of this masterbatch technique results in a more uniform dispersion of the diorganopolysiloxane and the organophosphorous compound in the resin matrix. The resin used in the preparation of the masterbatch may be the same as, or different from, the matrix polyolefin resin. Preferably, the two are of the same general type (e.g., polyethylene in the masterbatch and as the matrix).

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 25° C., unless indicated to the contrary.

Materials

The following materials were employed in the examples.

LDPE1=a low density polyethylene having a density of 0.923 g/cc and marketed as DOW™GP-LDPE 5004IM by the Dow Chemical Co.

LDPE2=a low density polyethylene having a density of 0.919 g/cc filled with 20% of diatomaceous earth and marketed as ASI F20 by A. Schulman, Inc.

LLDPE1=a linear, low density polyethylene; an octene-based copolymer of ethylene having a density of 0.917 g/cc and marketed under the trade name DOWLEX™ 2047A by the Dow Chemical Co., Midland, Mich. (LOT 1155943).

LLDPE2=a linear, low density polyethylene; an octene-based copolymer of ethylene marketed under the trade name DOWLEX™ 2035 by the Dow Chemical Co. (Freeport, Tex.).

LLDPE3=a linear, low density polyethylene; a hexene-based copolymer of ethylene having a density of 0.918 g/cc and marketed under the trade name NOVAPOL™ TF-0119-F by Novacor Chemical Ltd.(Calgary, Canada).

OP1=an organophosphorous compound, Santicizer™ 154, marketed by Monsanto (St. Louis, Mo.) and described as t-butylphenyl diphenyl phosphate.

OP2=an organophosphorous compound, Irgafos™ 168, marketed by Ciba Geigy Corp. (Hawthorne, N.Y.) and described as tris(2,4-di-tert-butylphenyl)phosphite.

OP3=an organophosphorous compound, Santicizer™ 143 marketed by Monsanto and described as a triaryl phosphate ester.

OP4=an organophosphorous compound, Mark™ 11788, marketed by Witco (Greenwich, Conn.) and described as trisnonylphenyl phosphite.

OPS5=a trisnonylphenyl phosphite obtained from Aldrich Chemical Co. (Milwaukee, Wis.).

OP6=an organophosphorous compound, Mark™ 5082, marketed by Witco and described as a triaryl phosphite composition containing about 95% trisnonylphenyl phosphite.

OP7=an organophosphorous compound, Fyrolflex™ RDP, marketed by Akzo Nobel (Dobbs Ferry, Conn.) and described as resorcinol bis(diphenyl phosphate) of the structure

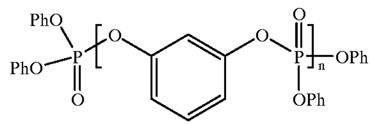

wherein Ph represents a phenyl radical and n is 1.

OP8=a silyl phosphonate mixture consisting essentially of the following structures in the approximate proportions:

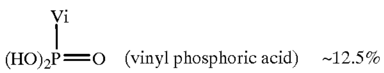

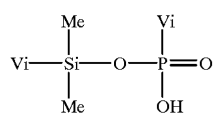

(mono(dimethylvinylsilyl)vinyl phosphonate) ~50%

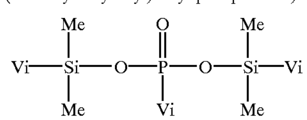

(bis(dimethylvinylsilyl)vinyl phosphonate) ~25%

-continued

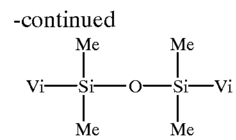

(tetramethyldivinyldisiloxane) ~7.5% wherein Me and Vi hereinafter denote methyl and vinyl radicals, respectively.

PDMS1=a linear dimethylhydroxysiloxy-terminated polydimethylsiloxane gum having a number average molecular weight of about 265,000 by GPC.

PDMS2=a linear polydimethylsiloxane oil having a number average molecular weight of 52,950 by GPC, wherein 1 mole percent (M%) of the terminal units are trimethylsiloxy and 99 mole percent of the terminal units are dimethylhydroxysiloxy.

Masterbatch MB1

A masterbatch consisting of 75% LDPE1 and 25% PDMS1was prepared by thoroughly mixing these components at elevated temperature in a Haake Rheocord™ 90 system twin-screw extruder (Haake—Paramus, N.J.), equipped with a TW 100 extruder having two counter-rotating intensive-mixing screws having a 1.225-inch rear diameter, 0.775-inch front diameter, and a length of approximately 13-inches. Temperatures of the four zones of the extruder were set at 170° C., 185° C., 185° C., and 185° C., respectively. This masterbatch composition (MB 1) was extruded through a strand die and chopped into pellets upon cooling.

Masterbatch PA1

In a similar manner, a masterbatch of 25% OP5 and 75% LDPE1 was prepared by adding 45.02 g of the polyethylene to a Haake Rheocord™ 9000 (sigma blade) mixer at 140° C and, after 10 minutes, adding 15.09 g of OP5 over a period of 20 minutes using a blade speed of 60 rpm.

Example 1

A polyethylene resin composition of the invention was prepared by uniformly dispersing MB1 and PA1 in LLDPE1. In this procedure, 16 grams of MB 1 pellets and 48 grams of PA1 were added to 20 lbs. (9,072 g) of LLDPE1 pellets and the combination shaken to yield a pre-mix containing about 440 parts per million (ppm) of PDMS1 and 1320 ppm of OP5 based on the total weight of the premix.

The above described pre-mix was then extruded at two extruder speeds (20 and 40 revolutions per minute=RPM). The extruder used was a Davis-Standard DS-20 single-screw extruder, equipped with a ribbon die (0.04 inch×1.0 inch=1.02 mm×25.4 mm), 2-inch (50.8 mm) diameter screw (3:1 compression ratio) and 24/1 length/diameter ratio. Zones 1, 2 and 3 of the extruder were set at 340° F. (171° C.), 365° F. (185° C.) and 365° F. (185° C.), respectively, whereas the flange and die temperatures were set at 350° F. (177° C.). The ribbon die was fabricated from 1018 mild steel which was electrolytically plated with nickel using a Bright Chloride Nickel Plating process to provide a nominal nickel coating thickness of 0.0002 to 0.0004 inch.

Samples of extruded ribbon were obtained at the two extruder speeds for evaluation of surface roughness. At an extruder speed of 20 RPM, a 20 foot-long ribbon sample was taken and cut into 20 1-foot sections. Surface roughness measurements were performed on each 1-foot section and an averaged surface roughness determined. This process was repeated at an extruder speed of 40 RPM. The average surface roughness values $R_a$ (in micro-cm) are reported in Table 1.

Surface roughness was determined with a Mitutoyo Surftest 402 surface roughness tester. Briefly, this test comprised dragging a diamond-tipped stylus, coupled to a variable reluctance transducer, over the top surface of the extruded sample (in the longitudinal or extrusion direction). Each stroke was about 3 mm long and the mean height of the irregularities was obtained.

Example 2

The general procedures of Example 1 were followed wherein MB 1 and OP2 were dispersed in LLDPE1 so as to provide levels in the premix of about 440 parts per million (ppm) of PDMS1 and about 10031 ppm of OP2, again based on the total weight of the premix. This premix was extruded and evaluated as discussed above and the results are shown in Table 1.

(Comparative) Examples 3–5

An unmodified polyethylene control using only virgin LLDPE1 was extruded and evaluated for surface roughness as in Examples 1–2 and these results are also shown in Table 1 (Example 3).

Similarly, a composition which consisted of a dispersion of only MB 1 in LLDPE1 so as to provide a PDMS1 level of about 440 ppm was prepared and tested (Example 4). Further, a composition which consisted of a dispersion of only OP2 in LLDPE1 so as to provide an OP2 level of about 1320 ppm was prepared and tested (Example 5). The roughness values for these compositions are also presented in Table 1.

TABLE 1

| Composition | Example 1 | Example 2 | (Comparative) Example 3 (Control) | (Comparative) Example 4 | (Comparative) Example 5 |
|---|---|---|---|---|---|
| PDMS1 (ppm) | 440 | 440 | — | 440 | 0 |
| OP5 (ppm) | 1320 | — | — | — | — |
| OP2 (ppm) | — | 10031 | — | — | 1320 |
| Surface Roughness (micro-cm) | | | | | |
| @ 20 RPM | 9.9 | 9.4 | 1807 | 1611 | 1204 |
| @ 40 RPM | 89.7 | 46.5 | 1967 | 1378 | 1141 |

It can be seen from Table 1 that addition of only the organophosphorous compound (Example 5) or only the hydroxy-functional polydimethylsiloxane (Example 4) to the linear low density polyethylene did not greatly improve the surface roughness character when extruded through the nickel-plated die. To the contrary, modification with both the silicone and an organophosphorous compound, according to the instant invention, resulted in dramatic reduction of surface roughness (Examples 1 and 2). It was, however, observed that the surface of films produced from the composition of Example 2 was sticky and had a powdery residue which indicates that a lower level of the OP2 would be preferred in this system.

Example 6

The procedure of Example 1 was repeated wherein the amount of PA1 was varied so as to provide the OP5 level indicated in the first column of Table 2, the level of PDMS1 being maintained at 440 ppm. As indicated in Table 2, extrusion and evaluation of the resulting films showed an initial reduction of surface roughness as the organophosphorous compound content was increased, this effect becoming rather dramatic at a level between 33 and 55 ppm of the OP5.

TABLE 2

| Level of OP5 (ppm) | Surface Roughness (micro-cm) @ 20 RPM | @ 40 RPM |
|---|---|---|
| 0 (Control) | 1611 | 1378 |
| 10 | 869 | 1332 |
| 33 | 632 | 858 |
| 55 | 2.7 | 38.4 |
| 110 | 4.1 | 52.3 |
| 440 | 3.3 | 29.5 |
| 1320 | 9.9 | 89.7 |

Examples 7–13

The following masterbatches were prepared by the methods similar to those described above using a Leistritz co-rotating twin screw extruder having an L/D ratio of 40:1 and a screw diameter of 18 mm screw at 220° C. (all zones). The blends were subsequently pelletized.

MB2=5 parts by weight of PDMS1 dispersed in 95 parts by weight of LLDPE2.

MB3=5 parts by weight of PDMS2 dispersed in 95 parts by weight of LLDPE2.

MB4 (MB4a through MB4g)=5 parts by weight of the respective organophosphorous compound indicated in Table 3 dispersed in 95 parts by weight of LLDPE2.

These masterbatches were dispersed in LLDPE3 so as to provide 500 ppm of PDMS1, 500 ppm PDMS2 and 1000 ppm of the respective organophosphorous compound, as indicated in Table 3.

Each of the above compositions was then fabricated into a blown film using the following equipment setup:

Killion Blown Film extruder; 1 inch (25.4 mm) Screw diameter; L/D=24: 1; Maddock mix head on screw; Breaker plate at screw tip, no screen pack; approximately 1 year old Electroless Nickel die; 0.150 inch (3.81 mm) land length on inner mandrel insert; 0.50 inch (12.7 mm) land length on outer lips; 0.015 inch (0.38 mm) die gap.

Extrusion Parameters

Barrel temps: Zone 1=355° F. (179° C.); Zone 2=370° F. (188° C.); Zone 3=375° F. (191° C.); Adapter=370° F. (188° C.); Die 1=365° F. (185° C.); Die 2=365° F. (185 C.). Top Nip takeoff speed=18.0 fpm (5.49 m/min.); Blower (Air ring)=40%; Screw speed=40 RPM; Blown film thickness=1–2 mil (0.025–0.051 mm).

Before each film blowing operation, the extruder was purged with LDPE2 to scour (clean) the barrel and screw. This was followed by a transition to virgin LLDPE3 to make sure melt fracture severity was the same as the original control material in each case before the next formulation was run and sampled. Then, before running each formulation, the extruder was conditioned (flooded) with the respective masterbatch to coat the extruder and die with the silicone and phosphorous additives, as indicated in Table 3. Finally, each formulation was extruded for 30 minutes and a representative blown film sample was taken.

Film quality was determined by three individuals having no knowledge of the formulations (i.e., a "blind" experiment), each using two different techniques to assess the degree of melt fracture. In a first series, a representative film sample was viewed using a bright light background to provide a visual assessment of melt fracture recorded. In a second series, photographs of representative film samples laid over a flat background having contrast-enhancing black bars printed thereon were judged as to extent of melt fracture. The results of the above evaluations were compiled according to the following scheme:

1=melt fracture quite noticeable (essentially same as unmodified resin controls)

2=melt fracture somewhat improved over control resin

3=melt fracture essentially eliminated and much improved over control resin.

The above rankings were summed for the three testers for each type of evaluation to arrive at a cumulative ranking of 6 to 18. For example, a sample having most melt fracture had a cumulative ranking of 3 individuals×(1+1)=6; one having the least melt fracture had a cumulative ranking of 3 individuals×(3+3)=18, these cumulative rankings being reported in Tables 3–5.

(Comparative) Examples 14–15

The extrusion procedures of Examples 7–13 were followed to prepare blown film from virgin LLDPE3 which served as a control for these compositions (Example 14). Additionally, a dispersion of 500 ppm of PDMS1 and 500 ppm of PDMS2 (from the respective masterbatches) in LLDPE3 was prepared as a comparison system containing no organophosphorous compound (Example 15).

The results of the blown film experiments are summarized in Table 3 for Examples 7 to 15, which also records the die pressure, shear rate and extruder motor current usage during each run. From this table it can be seen that the compositions of the invention provided films having fewer defects than the control resin (Example 14) and, in general, for the system which contained only the silicone gum (Example 15). In some cases (Examples 12 and 13), the film quality was exceptional. Furthermore, as suggested by the results of Examples 1–2 and 6, the improvements over unmodified resin, or resin modified only with the silicone gum, would have been even more dramatic had the die surface not contained residual phosphorous from the electroless nickel coating process (i.e., were the die plated by an electrolytic process or had it been in use for a longer time).

TABLE 3

| Example | 7 | 8 | 9 | 10 | 11 | 12 | 13 | 14 | 15 |
|---|---|---|---|---|---|---|---|---|---|
| Organophosphorous Compound | OP1 | OP2 | OP3 | OP4 | OP6 | OP7 | OP8 | — | — |
| Melt Temp (° C.) | 219 | 220 | 218 | 221 | 219 | 220 | 220 | 221 | 221 |
| Die Pressure (MPa) | 43.2 | 43.0 | 42.1 | 41.9 | 40.0 | 40.7 | 36.2 | 46.4 | 41.6 |
| Current (Amperes) | 5.8 | 6.6 | 5.6 | 6.5 | 6 | 6.3 | 5.5 | 7.2 | 6.5 |
| Shear Rate (l/s) | 350 | 350 | 353 | 348 | 341 | 345 | 333 | 365 | 353 |
| Flood (g of MB4) | 40 | 40 | 40 | 40 | 40 | 40 | 40 | 0 | 0 |
| Flood (g of MB2) | 10 | 10 | l0 | 10 | 10 | 10 | 10 | 0 | 10 |
| Flood (g of MB3) | 10 | 10 | 10 | 10 | 10 | 10 | 10 | 0 | 10 |
| Film Rating | 10 | 8 | 9 | 10 | 10 | 18 | 18 | 6 | 9 |

(Comparative) Examples 16–17

A control sample was extruded through a chrome-plated die according to the procedures of Examples 7–15 using only virgin LLPDE3 (Example 16). Additionally, a dispersion of only 522 ppm PDMS1 in LLDPE3 (Example 17) was prepared, using MB5 as the silicone source (MB5=a dispersion of 25% PDMS1 in 75% LDPE1). This was extruded through the chromium-plated die and the blown films evaluated, as reported in Table 4.

TABLE 4

| (Comp.) Example | 16 | 17 |
|---|---|---|
| PDMS1 (ppm) | — | 522 |
| Melt Temp (°C.) | 206 | 210 |
| Die Pressure (MPa) | 48.5 | 37.9 |
| Current (Amperes) | 7.3 | 5 |
| Shear Rate (1/s) | 416 | 415 |
| Flood (g of MB5) | 0 | 4 |
| Rating of film quality | 10 | 17 |

It is seen from Table 4 that melt fracture was essentially eliminated by incorporating PDMS1 in the resin, therefore obviating the need for the organophosphorous compound when the die surface was chromium.

(Comparative) Example 18–19

The procedures of (Comparative) Examples 16 and 17 were repeated using a 303 type stainless steel die with a die gap of 0.030" (0.762 mm).

TABLE 5

| (Comp.) Example | 18 | 19 |
|---|---|---|
| PDMS1 (ppm) | — | 522 |
| Melt Temp (°C.) | 221 | 228 |
| Die Pressure (MPa) | 48.9 | 42.7 |
| Current (Amperes) | 7.8 | 6.5 |
| Shear Rate (1/s) | 113 | 109 |
| Flood(g of MB5) | 0 | 4 |
| Rating of film quality | 12 | 17 |

Again, it is seen from Table 5 that when the die was fabricated from a stainless steel, there was no need for including the organophosphorous compound to obtain a blown film having essentially no melt fracture.

That which is claimed is:

1. A method for processing a thermoplastic resin composition comprising extruding said composition through a nickel die, said composition comprising (A) 100 parts by weight of a thermoplastic resin;

(B) 0.01 to 1 part by weight of a hydroxy-functional diorganopolysiloxane having a number average molecular weight of at least 10,000; and (C) 0.001 to 1 part by weight of an organophosphorous compound.

2. The method according to claim 1, wherein said thermoplastic resin is selected from the group consisting of olefin polymers, olefin copolymers, olefin terpolymers and blends thereof.

3. The method according to claim 2, wherein said diorganopolysiloxane is a linear hydroxy-terminated polydimethylsiloxane.

4. The method according to claim 3, wherein said organophosphorous compound has a formula selected from the group consisting of $$(R''O)_3P{=}O,$$

$$(R''O)_{3-x}\underset{\substack{|\\R_x}}{P}{=}O,$$

$$P(OR'')_3 \text{ and}$$

$$R_xP(OR'')_{3-x}$$

wherein R" is independently selected from the group consisting of a phenyl group and a hydrocarbyl-substituted phenyl group, R is independently selected from hydrocarbyl groups having 1 to 20 carbon atoms and x is an integer having a value of 1 to 3.

5. The method according to claim 4, wherein said organophosphorous compound is selected from the group consisting of triphenylphosphate, tert-butylphenyl diphenyl phosphate, triphenylphosphine oxide, tris(2,4-di-tert-butylphenyl)phosphite, trisnonylphenylphosphite and triphenylphosphine.

6. The method according to claim 3, wherein said organophosphorous compound has a formula selected from the group consisting of $$(R'_3SiO)_z(HO)_{3-z}P{=}O,$$

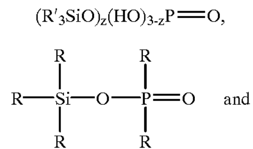

and

-continued

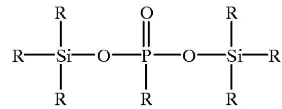

wherein R is independently selected from hydrocarbyl groups having 1 to 20 carbon atoms, R' is a hydrocarbyl group having 1 to 20 carbon atoms and z is an integer having a value of 1 to 3.

7. The method according to claim 6, wherein said organophosphorous compound is selected from the group consisting of mono(dimethylvinylsilyl)vinyl phosphonate, bis(dimethylvinylsilyl)vinyl phosphonate and mixtures thereof.

8. The method according to claim 3, wherein said organophosphorous compound has a formula

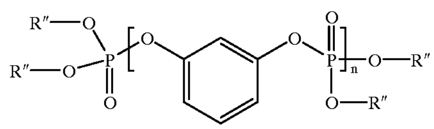

wherein R" is independently selected from the group consisting of a phenyl group and a hydrocarbyl-substituted phenyl group and n has an average value of 1 to 3.

9. The method according to claim 8, wherein said organophosphorous compound has a formula

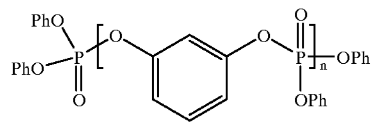

wherein Ph denotes a phenyl radical and n is 1.

10. The method according to claim 2, wherein said die has a surface selected from the group consisting of electrolytically coated nickel and electroless coated nickel.

* * * * *